United States Patent [19]
Okada et al.

[11] Patent Number: 6,077,048
[45] Date of Patent: Jun. 20, 2000

[54] TORQUE LIMITING MECHANISM

[75] Inventors: Masahiko Okada; Takashi Ban; Hidefumi Mori; Tatsuyuki Hoshino; Nobuaki Hoshino; Tatsuya Hirose, all of Kariya, Japan

[73] Assignee: Kabushiki Kaisha Toyoda Jidoskokki Seisakusho, Aichi-ken, Japan

[21] Appl. No.: 09/044,887

[22] Filed: Mar. 20, 1998

[30] Foreign Application Priority Data

Mar. 24, 1997 [JP] Japan ..................................... 9-069797

[51] Int. Cl.⁷ ................................................... F04B 49/00
[52] U.S. Cl. ........................................... 417/223; 417/269
[58] Field of Search .............................. 192/223, 71, 4 R, 192/12 BA, 17 R; 83/205, 283; 188/134; 417/223, 269; 474/135, 112

[56] References Cited

U.S. PATENT DOCUMENTS

| | | | |
|---|---|---|---|
| 3,667,575 | 6/1972 | Bouhot | 188/134 |
| 4,510,833 | 4/1985 | Uozumi | 83/205 |
| 4,824,421 | 4/1989 | Komorowski | 474/135 |
| 5,391,058 | 2/1995 | Goto et al. | 417/223 |

FOREIGN PATENT DOCUMENTS

| | | |
|---|---|---|
| 0 345 537 | 12/1989 | European Pat. Off. . |
| 0 702 167 A1 | 3/1996 | European Pat. Off. . |
| 900 032 | 4/1953 | Germany . |
| 43 09 303 A1 | 9/1993 | Germany . |
| 8-159028A | 6/1996 | Japan . |
| WO 91/10075 | 7/1991 | WIPO . |

*Primary Examiner*—Teresa Walberg
*Assistant Examiner*—Leonid Fastovsky
*Attorney, Agent, or Firm*—Morgan & Finnegan, L.L.P.

[57] ABSTRACT

A torque limiting device for a compressor. An input shaft of the compressor is connected to the torque limiting device so that the power source driving the compressor will not be affected if abnormal conditions cause the compressor to generate an excessive load. A flexible connector is located between the power source and the compressor. The flexible connector is deformed when torque is applied to the compressor input shaft. When the applied torque exceeds a predetermined value, a spring is permitted to expand axially, which uncouples the compressor from the power source. The torque at which the device uncouples is stable and predictable.

28 Claims, 11 Drawing Sheets

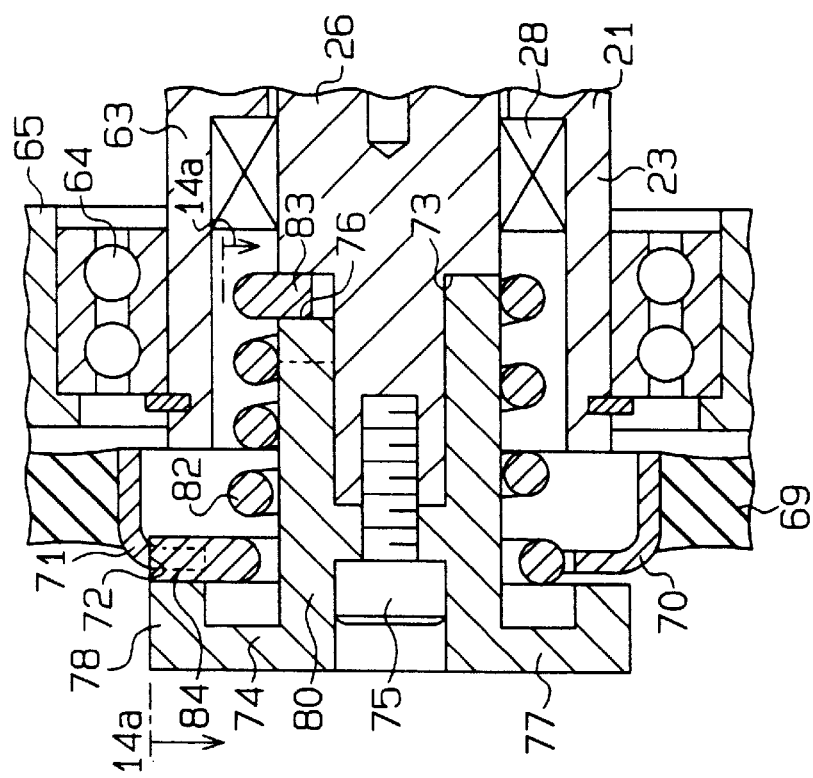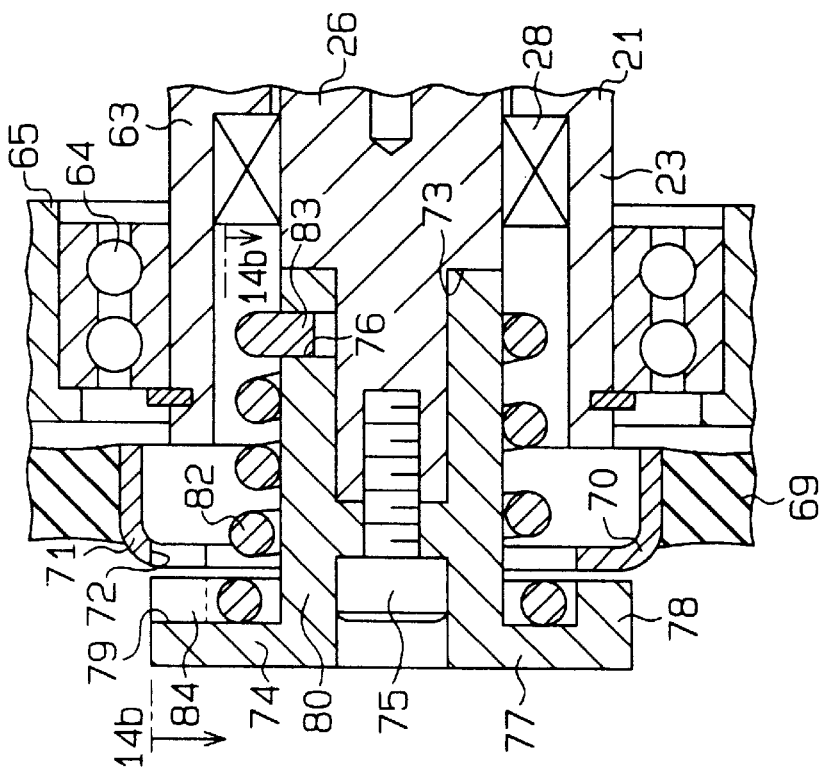

TORQUE LIMITING MECHANISM

BACKGROUND OF THE INVENTION

The present invention relates to a torque limiting mechanism that couples a power source with a driven apparatus. More particularly, the present invention pertains to a mechanism that disconnects the power source from the driven apparatus when a malfunction occurs in the driven apparatus and consequently the load of the driven apparatus becomes excessive.

Japanese Unexamined Patent Publication No. 8-159028 describes such a torque limiting mechanism that couples a power source with a driven apparatus. This mechanism includes a power receiver and a pulley that are located coaxially with a rotary shaft of the driven apparatus. The pulley is rotatably supported on the driven apparatus by an angular bearing and is coupled to the power source by a belt. The receiver is secured to the rotary shaft and is connected with the pulley by rolling balls. Specifically, the receiver has recesses, and the pulley also has recesses the number of which corresponds to the number of the recesses in the receiver. Each ball is located between the receiver and the pulley and is fitted in a corresponding pair of the recesses. The pulley and the angular bearing are urged toward the receiver by a disk spring. Rotation of the pulley is thus transmitted to the rotary shaft by way of the balls and the receiver. When the load torque of the driven apparatus exceeds a predetermined value, the balls are disengaged from the recesses of the pulley. Accordingly, the pulley is disconnected from the power receiver and the power transmission is stopped.

The balls are located near the periphery of the receiver. Therefore, rotation of the pulley applies centrifugal force to the balls. When the rotation speed of the pulley is high, a great centrifugal force can disengage the balls from the recesses of the power receiver and the pulley. This disconnects the power source from the driven apparatus even if the load torque of the driven apparatus is below the predetermined value.

The value of load torque of the driven apparatus at which the torque limiting mechanism disconnects the power source from the driven apparatus is determined by the frictional force between the balls and the recesses of the pulley, and the force of the disc spring. In other words, the coefficient of friction between the balls and the recesses of the pulley must be taken into account when determining the load torque value at which the power source is disconnected from the driven apparatus. Therefore, it is difficult to stabilize the disconnection characteristics of the torque limiting mechanism. That is, the mechanism may disconnect the power source from the driven apparatus when the load torque applied is smaller or greater than the predetermined value.

SUMMARY OF THE INVENTION

Accordingly, it is an objective of the present invention to provide a torque limiting mechanism that prevents a power source from being accidentally disconnected from a driven apparatus when the speed of the driven apparatus is high, and has predictable behavior characteristics.

To achieve the foregoing and other objectives and in accordance with the purpose of the present invention, a torque limiting apparatus for transmitting power supplied from a power source to a driven apparatus is provided. The apparatus includes a drive rotor, a driven rotor and a flexible connector. The drive rotor is powered by the power source. The driven rotor is driven by the drive rotor under normal conditions. The driven rotor is connected to the driven apparatus such that the driven rotor delivers power to and receives load torque from the driven apparatus. The flexible connector is located between and coupled to the drive rotor and the driven rotor for connecting the drive rotor to the driven rotor and for transmitting torque from the drive rotor to the driven rotor. Torque deforms the flexible connector. The flexible connector is disconnected from one of the drive rotor and the driven rotor when the torque applied to the flexible connector exceeds a certain torque value to limit the torque applied between the drive rotor and the driven rotor.

BRIEF DESCRIPTION OF THE DRAWINGS

The invention, together with objects and advantages thereof, may best be understood by reference to the following description of the presently preferred embodiments together with the accompanying drawings in which:

FIG. 12 is an enlarged partial cross-sectional view illustrating a torque limiting mechanism according to a fourth embodiment of the present invention when engaged;

FIG. 13 is an enlarged partial cross-sectional view illustrating the torque limiting mechanism of FIG. 12 when disengaged;

DETAILED DESCRIPTION OF THE PREFERRED EMBODIMENTS

A torque limiting mechanism according to a first embodiment of the present invention will be described with reference to FIGS. 1 to 5. This mechanism is used with a clutchless type variable displacement compressor.

First, the clutchless type variable displacement compressor will be described.

Figure 1:
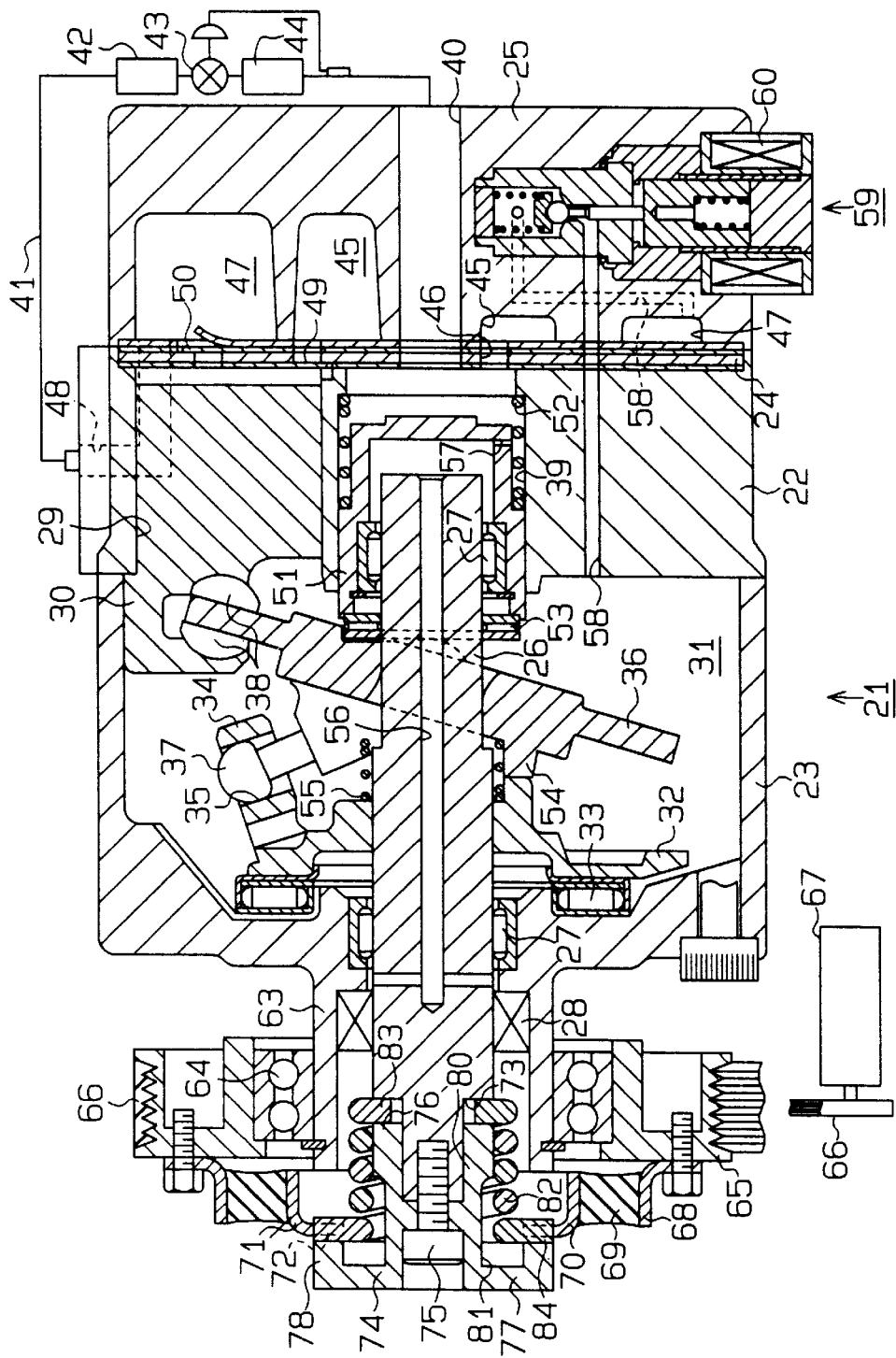
FIG. 1 is a cross-sectional view illustrating a clutchless type variable displacement compressor having a torque limiting mechanism according to a first embodiment of the present invention.

FIG. 1 shows a clutchless type variable displacement compressor 21 as a driven apparatus. The compressor 21 includes a cylinder block 22, a front housing 23 and a rear housing 25. The front housing 23 is secured to the front end face of the cylinder block 22 and the rear housing 25 is secured to the rear end face of the cylinder block 22 with a valve plate 24 in between.

An input shaft 26, which may be referred to as a driven rotor, is rotatably supported in the center of the cylinder block 22 and the front housing 23 by a pair of radial bearings 27. A lip seal 28 is located between the input shaft 26 and the front housing 23.

Cylinder bores 29 extend through the cylinder block 22. The cylinder bores 29 are located about the input shaft 26 and are spaced apart at equal intervals. Each cylinder bore 29 reciprocally houses a single-headed piston 30. A crank chamber 31 is defined between the cylinder block 22 and the front housing 23.

A lug plate 32 is fixed to the input shaft 26 in the crank chamber 31. The lug plate 32 rotates integrally with the input shaft 26. A thrust bearing 33 is located between the inner wall of the front housing 23 and the lug plate 32. The lug plate 32 has a support arm 34 protruding toward the cylinder block 22. A pair of guide holes 35 are formed in the support arm 34.

A disk-shaped swash plate 36 is tiltably supported on the input shaft 26. The swash plate 36 has a pair of guide balls 37 protruding toward the lug plate 32. The guide balls 37 are pivotally and slidably fitted in the guide holes 35 of the support arm 34. That is, the swash plate 36 is coupled to the lug plate 32 in a hinge-like manner. The guide balls 37 allow the swash plate 36 to tilt with respect to the lug plate 32.

Each piston 30 is coupled to the swash plate 36 by a pair of semispherical shoes 38. When the input shaft 26 is rotated, the swash plate 36 rotates integrally with the shaft 26. At this time, the shoes 38 convert rotation of the swash plate 36 into linear reciprocation of the pistons 30 in the cylinder bores 29.

A shutter chamber 39 is defined at the center of the cylinder block 22 and extends along the axis of the input shaft 26. A suction passage 40 is defined at the center portion of the rear housing 25 and the valve plate 24. The passage 40 also extends along the axis of the input shaft 26. The front end of the passage 40 communicates with the shutter chamber 39 and the rear end is connected to an external refrigerant circuit 41. The circuit 41 includes a condenser 42, an expansion valve 43 and the evaporator 44.

An annular suction chamber 45 is defined in the rear housing 25. The suction chamber 45 is connected with the shutter chamber 39 by a communication hole 46. An annular discharge chamber 47 is defined around the suction chamber 45 in the rear housing 25. The discharge chamber 47 is connected to the external refrigerant circuit 41 by an outlet passage 48.

Suction valve mechanisms 49 and discharge valve mechanisms 50 are formed on the valve plate 24 to correspond to each cylinder bore 29. As each piston 30 moves from the top dead center to the bottom dead center in the associated cylinder bore 29, refrigerant gas in the suction chamber 45 is drawn into the cylinder bore 29 through the associated suction valve mechanism 49. As the piston 30 moves from the bottom dead center to the top dead center in the cylinder bore 29, the gas in the cylinder bore 29 is compressed to a predetermined pressure and is discharged into the discharge chamber 50 through the associated discharge valve mechanism 50.

A cylindrical shutter 51 is slidably accommodated in the shutter chamber 39 in the cylinder block 22. The axis of the shutter 51 is aligned with the axis of the input shaft 26. A spring 52 is located between the shutter 51 and the rear end wall of the shutter chamber 39. The spring 52 urges the shutter 51 toward the swash plate 36. The rear end of the input shaft 26 is slidably inserted in the shutter 51 with a radial bearing 27 in between. A thrust bearing 53 is located between the shutter 51 and the swash plate 36 and is slidably fitted to the input shaft 26.

When moved to the minimum inclination position, the swash plate 36 moves the shutter 51 to a closed position against the force of the spring 52. At the closed position, the shutter 51 contacts the opening of the suction passage 40. This closes the suction passage 40 and stops the supply of refrigerant gas from the external refrigerant circuit 41 to the suction chamber 45. The minimum inclination of the swash plate 36 is slightly greater than zero degrees and is limited by positioning the shutter 51 at the closed position.

The compressor 21 then operates with the swash plate 36 at the minimum inclination position even if there is no cooling load. The compressor 21 is known as a clutchless type compressor since it is not clutched on and off.

When the swash plate 36 is at the maximum inclination position, the shutter 51 is moved to the open position by the force of the spring 52. In other words, the shutter 51 is moved away from the opening of the suction passage 40. The suction passage 40 thus communicates the external refrigerant circuit 41 with the suction chamber 45 via the shutter chamber 39 and the communication hole 46. This introduces refrigerant gas to the suction chamber 45. The abutment of a stopper 54 formed on the front end face of the swash plate 36 against the rear end face of the lug plate 32 limits the maximum inclination of the swash plate 36. At this position of the swash plate 36, the compressor 21 operates at the maximum displacement.

A spring 55 is located between the lug plate 32 and the swash plate 36. The spring 55 urges the swash plate 36 toward the minimum inclination position.

A pressure release passage 56 is defined at the center portion of the input shaft 26. The pressure release passage 56 has a pair of inlets, which open to the crank chamber 31, and an outlet, which opens to the interior of the shutter 51. The interior of the shutter 51 is connected with the shutter chamber 39 by a pressure release hole 57, which is formed in the shutter wall near the rear end of the shutter 51. The pressure in the crank chamber 31 is therefore communicated with the suction chamber 45 by the pressure release passage 56, the interior of the shutter 51, the pressure release hole 57, the shutter chamber 39 and the communication hole 46.

A supply passage 58 is defined in the rear housing 25, the valve plate 24 and the cylinder block 22 for connecting the discharge chamber 47 with the crank chamber 31. An electromagnetic valve 59 is accommodated in the rear housing 25 midway in the supply passage 58. The control valve 59 includes a solenoid 60. When the solenoid 60 is excited, the valve 59 closes the passage 58. When the solenoid 60 is de-excited, the valve 59 opens the passage 58 thereby communicating the pressure in the discharge chamber 47 with the crank chamber 31. In this manner, the pressure in the crank chamber 31 is controlled.

The torque limiting mechanism will now be described.

The front housing 23 includes a support cylinder 63, which is integrally formed with the housing 23. An angular bearing 64 is located about the cylinder 63. The bearing 64 slides with respect to the axis of the input shaft 26. The outer ring of the bearing 64 is secured to a pulley 65, which may be referred to as a drive rotor. The pulley 65 is coupled to a vehicle engine 67, or a power source, by a belt 66.

Figure 2:
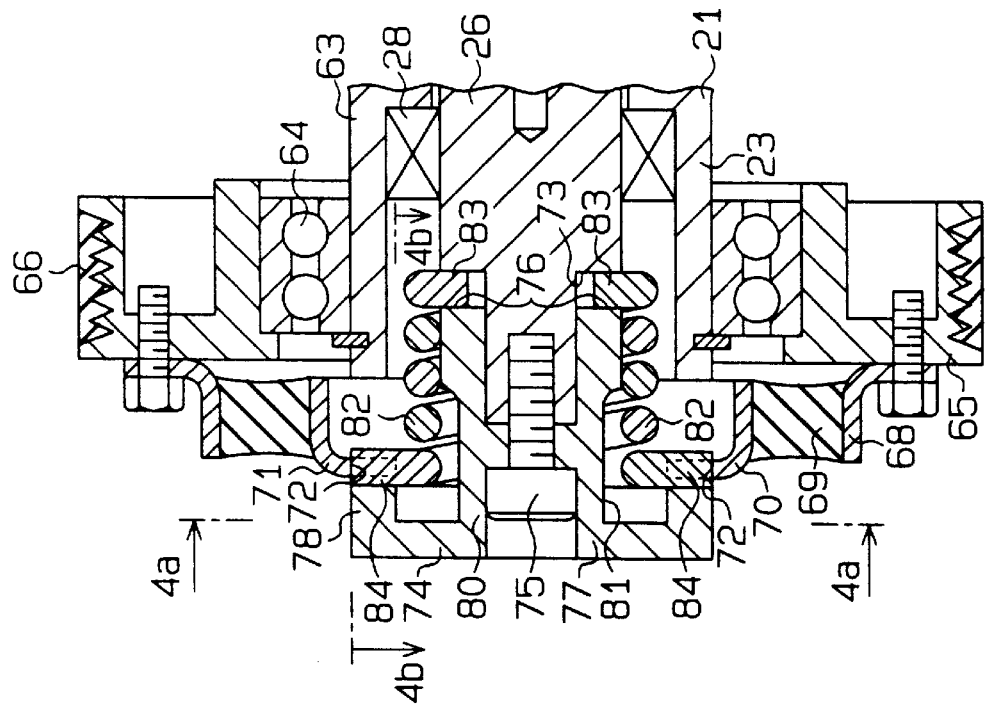
FIG. 2 is an enlarged cross-sectional view illustrating the torque limiting mechanism of FIG. 1 when engaged.
Figure 4A:
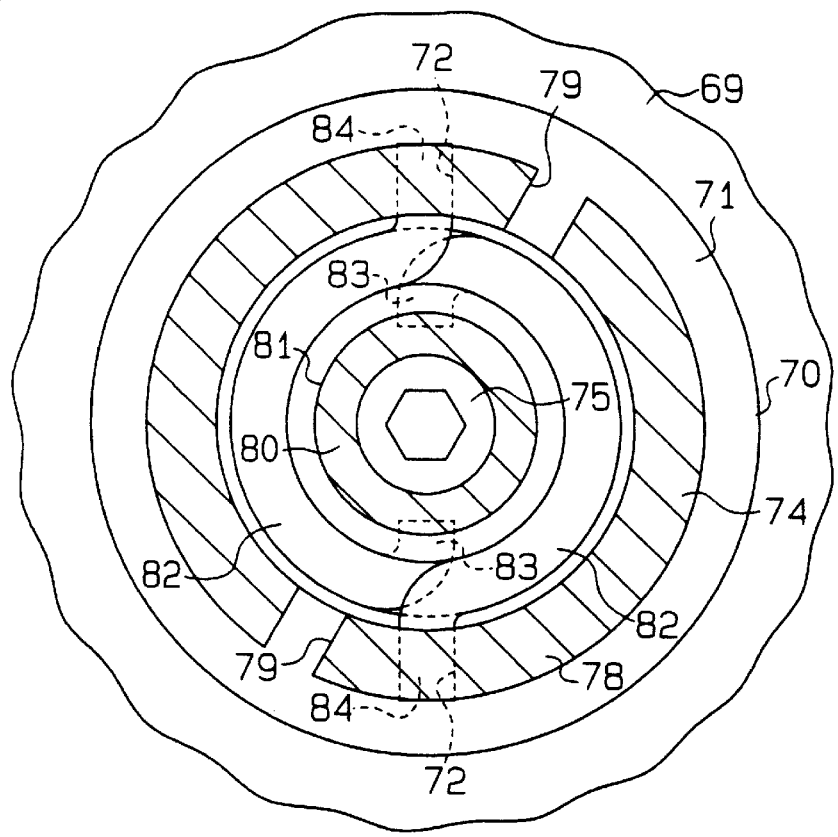
FIG. 4(a) is a cross-sectional view taken along line 4a—4a of FIG. 2.
Figure 4B:
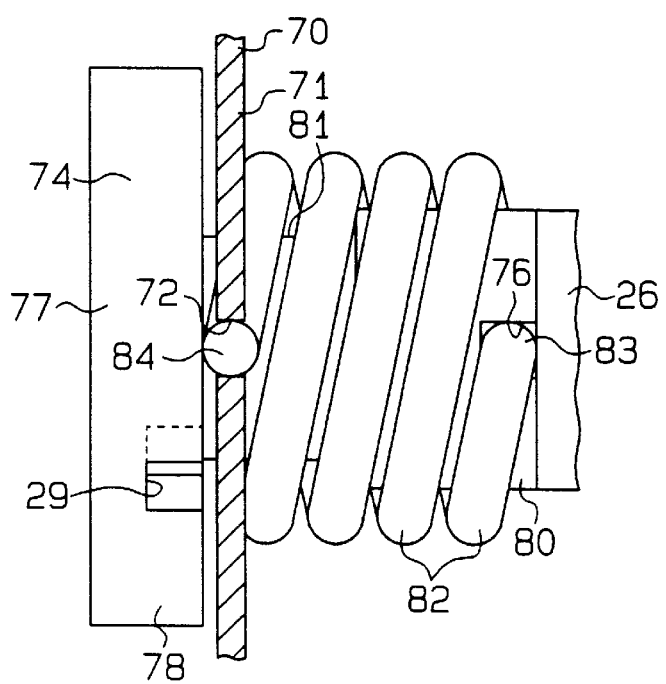
FIG. 4(b) is a cross-sectional view taken along line 4b—4b of FIG. 2.

As shown in FIGS. 1, 2 and 4, an annular outer supporting ring 68 is secured to the front side of the pulley 65 by bolts. The outer ring 68 has an L-shaped cross-section. An annular rubber buffer 69 is adhered to the inner wall of the outer ring 68. An annular inner supporting ring 70 is adhered to the inner wall of the rubber buffer 69. The inner ring 70 also has an L-shaped cross-section. The inner ring 70 includes a flange 71 protruding toward the input shaft 26. The flange 71 includes two openings 72, which are spaced apart by 180 degrees. The outer ring 68, the rubber buffer 69 and the inner ring 70 integrally rotate with the pulley 65.

A step 73 is formed near the front end of the input shaft 26. A retainer 74 is fitted to the step 73. The retainer 74 is secured to the shaft 26 by a bolt 75. The retainer 74 therefore integrally rotates with the input shaft 26. The retainer 74 includes a cylinder portion 80 and a flange 77.

The retainer 74 has a pair of engagement recesses 76, or rotation restrictors, in its rear end. The engagement recesses 76 are spaced apart by 180 degrees. The flange 77 of the retainer 74 has a lip 78. The lip 78 protrudes rearward from the outer periphery of the flange 77. The lip 78 extends toward the flange 71 of the inner ring 70. The lip 78 has a pair of release recesses 79. The release recesses 79 are separated from the engagement recesses 76 by a predetermined angle in a direction opposite to the direction of rotation of the input shaft 26. A neck 81 is formed in the front portion of the retainer 74.

A limit spring 82, or a connector, is wound about the retainer 74. The spring 82 is a double torsion coil spring including two parallel strands wound together. Each strand includes a first end and a second end. The first ends of the strands form permanent locking members 83 protruding inward toward each other. The second ends of the strands include releasable locking members 84 protruding outward away from each other. The strands are wound in such directions that the spring 82 constricts when receiving load torque by way of the input shaft 26 and the retainer 74. In other words, the spring 82 is a tightening spring that is twisted in a direction causing it to constrict under normal load conditions.

When the spring 82 and the retainer 74 are assembled with the input shaft 26, the spring 82 is placed about the retainer 74. Then, the retainer 74 is secured to the shaft 26 by the bolt 75. Securing the retainer 74 by the bolt 75 compresses the spring 82 by a predetermined amount in the axial direction.

The permanent locking members 83 are engaged with the engagement recesses 76 of the retainer 74. This restricts rotation of the permanent locking members 83 with respect to the input shaft 26. The releasable locking members 84 are engaged with the openings 72 of the inner ring 70 and contact the rear end face of the lip 78 of the retainer 74. The rear end of the spring 82, which includes the permanent locking members 83, contacts the retainer 74, whereas the front end of the spring 82, which includes the releasable locking members 84, is separated from the neck 81. The spring 82 urges the releasable locking members 84 toward flange 77 of the retainer 74.

In normal operation, the power of the engine 67 is transmitted to the input shaft 26 of the compressor 21 by way of the belt 66, the pulley 65, the outer ring 68, the rubber buffer 69, the inner ring 70, the spring 82 and the retainer 74. The spring 82 is located between the openings 72 of the inner ring 70 and the engagement recesses 76. The spring 82 therefore functions as a connector for coupling the drive rotor 65 with the input shaft 26.

The operation of the compressor 21 will now be described.

In the state of FIG. 1, the solenoid 60 of the electromagnetic valve 59 is excited and the supply passage 58 is closed. Therefore, the supply passage 58 stops flow of highly pressurized gas from the discharge chamber 47 to the crank chamber 31. Refrigerant gas in the crank chamber 31, on the other hand, enters the suction chamber 45 through the pressure release passage 56, the interior of the shutter 51, the pressure release hole 57, the shutter chamber 39 and the communication hole 46. The pressure in the crank chamber 31 approaches a lower suction pressure in the suction chamber 45. In this state, the swash plate 36 is retained at the maximum inclination position. The compressor 21 therefore operates at maximum displacement.

If the cooling load decreases in this state, the temperature of the evaporator 44 in the external refrigerant circuit 41 is gradually decreased. When the temperature of the evaporator 44 is equal to or lower than a frost forming temperature, the solenoid 60 is de-excited and opens the valve 59. The supply passage 58 then supplies highly pressurized gas in the discharge chamber 47 to the crank chamber 31. The pressure in the crank chamber 31 is increased, accordingly. This causes the swash plate 36 to move from the maximum inclination position to the minimum inclination position.

When in the minimum inclination position, the swash plate 36 moves the shutter 51 rearward through the thrust bearing 53. Accordingly, the shutter 51 is moved against the force of the spring 52 from the open position to the closed position. When the swash plate 36 is at the minimum inclination position, the shutter 51 is located at the closed position and contacts the opening of the suction passage 40. The shutter 51 closes the suction passage 40 and stops flow of gas from the external refrigerant circuit 41 to the suction chamber 45.

The minimum inclination of the swash plate 36 is slightly greater than zero degrees. Therefore, even if the inclination of the swash plate 36 is minimum, refrigerant gas in the cylinder bores 29 is discharged to the discharge chamber 47 and the compressor 21 operates at the minimum displacement. The refrigerant gas discharged to the discharge chamber 47 is drawn into the crank chamber 31 through the supply passage 58. The refrigerant gas in the crank chamber 31 is drawn back into the suction chamber 45 through the pressure release passage 56, the pressure release hole 57, the shutter chamber 39 and the communication hole 46. The gas is then drawn into the cylinder bores 29. That is, when the inclination of the swash plate 32 is minimum, refrigerant gas circulates within the compressor 21.

If the cooling load increases when the swash plate 36 is at the minimum inclination position, the temperature of the evaporator 44 gradually increases. When the temperature of the evaporator 44 exceeds a predetermined temperature, the solenoid 60 is excited and closes the valve 59. Accordingly, the supply passage 58 stops the flow of highly pressurized refrigerant gas from the discharge chamber 47 into the crank chamber 31. The pressure in the crank chamber 31 is released to the suction chamber 45 through the pressure release passage 56, the interior of the shutter 51, the pressure release hole 57, the shutter chamber 39 and the communication hole 46. This gradually decreases the pressure in the crank chamber 31 and moves the swash plate 36 from the minimum inclination position to the maximum inclination position.

As the swash plate 36 is moved toward the maximum inclination position, the spring 52 moves the shutter 51 from the closed position to the open position. In other words, the shutter 51 is separated from the opening of the suction passage 40 as illustrated in FIG. 1. This allows refrigerant gas from the external refrigerant circuit 41 to enter the suction chamber 45. The swash plate 36 is then located at the maximum inclination position and the compressor 21 operates at the maximum displacement.

When the engine 67 is stopped, the compressor 21 is also stopped. In this state, the electromagnetic valve 59 is opened and the swash plate 36 is at the minimum inclination position.

The operation of the torque limiting apparatus will now be described.

In a normal operation state, power of the engine 67 is transmitted to the input shaft 26 of the compressor 21 by the belt 66, the pulley 65, the outer ring 68, the rubber buffer 69, the inner ring 70, the spring 82 and the retainer 74.

The input shaft 26 receives load torque acting in a direction opposite to the rotational direction of the pulley 65. The value of the load torque varies in accordance with the operational state of the compressor 21. The load torque twists the spring 82. The permanent locking members 83 are prevented from rotating with respect to the input shaft 26 and the retainer 74. Therefore, the load torque rotates the releasable locking members 84 relative to the permanent locking members 83. The relative rotation of the releasable locking members 84 rotates the inner ring 70 relative to the retainer 74 so that the openings 72 approach the release recesses 79.

If the load torque does not exceed a predetermined range of magnitude and thus has little influence on the engine 67 and the belt 66, the rotation of the inner ring 70 relative to the retainer 74 does not align the openings 72 with the release recesses 79. In this state, the load torque is lessened by the torsional deformation of the spring 82, and the power of the engine 67 is continuously transmitted to the input shaft 26.

Even if the compressor 21 is in a normal state, phase differences of pressure changes in the cylinder bores 29, fluctuations of compression load and other factors generate fluctuations of the load torque that do not exceed the predetermined torque range. However, these torque fluctuations are moderated by torsional deformations of the spring 82.

Figure 3:
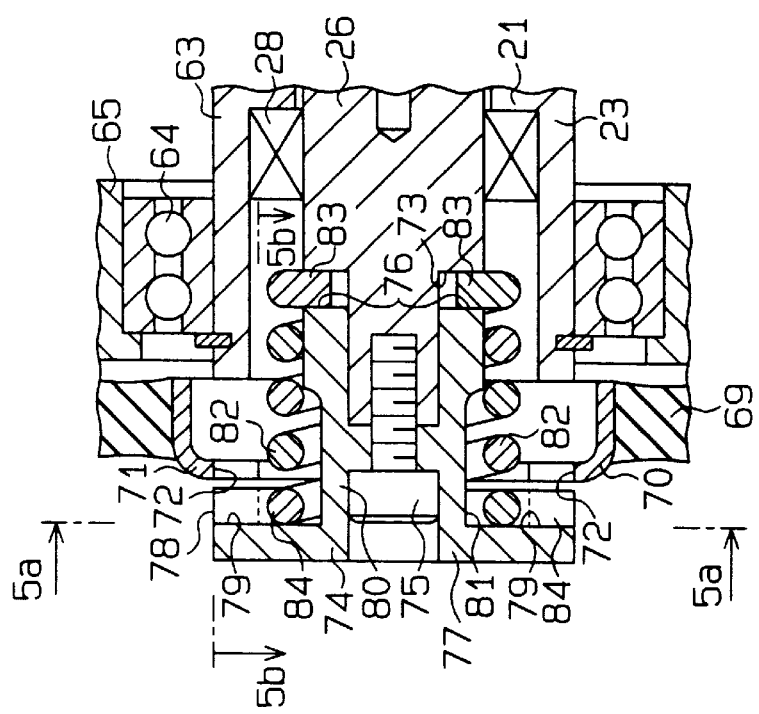
FIG. 3 is an enlarged partial cross-sectional view illustrating the torque limiting mechanism of FIG. 1 when disengaged.
Figure 5A:
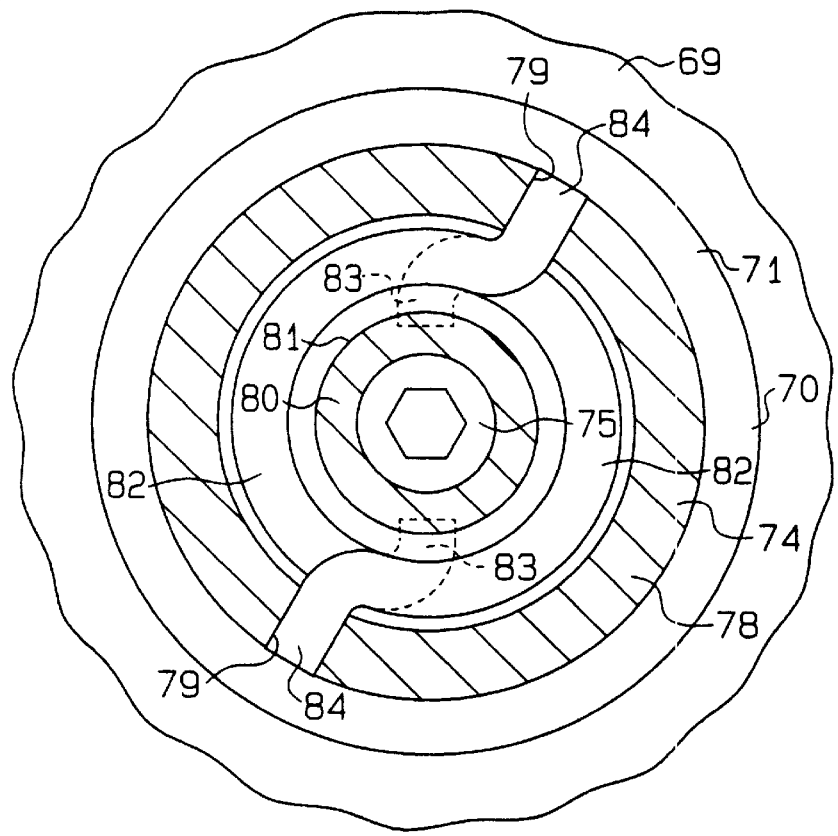
FIG. 5(a) is a cross-sectional view taken along line 5a—5a of FIG. 3.
Figure 5B:
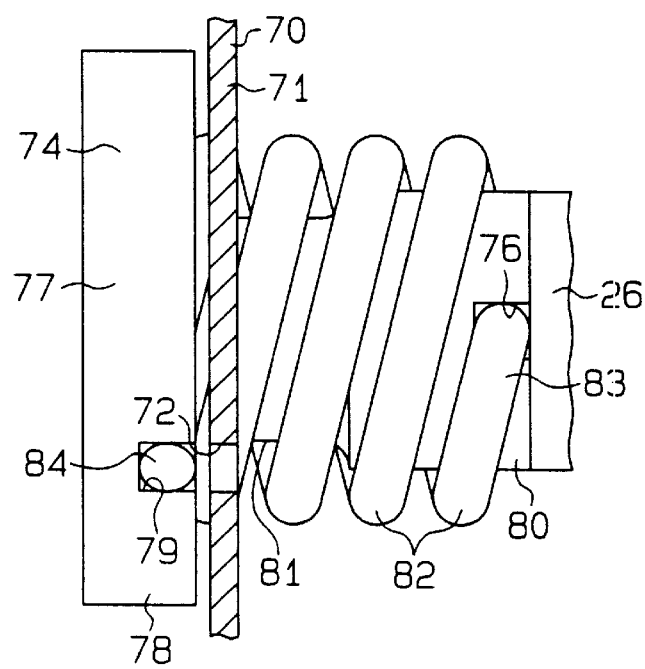
FIG. 5(b) is a cross-sectional view taken along line 5b—5b of FIG. 3.

If an excessive load torque is applied to the compressor 21, the spring 82 is greatly twisted as illustrated in FIGS. 3 and 5. The inner ring 70 rotates relative to the retainer 74 so that the openings 72 on the ring 70 are aligned with the release recesses 79 on the retainer 74. The force of the spring 82 then moves the releasable locking members 84 from the openings 72 on the ring 70 to the release recesses 79 of the retainer 74. As a result, power transmission between the pulley 65 and the input shaft 26 is stopped. In this state, the releasable locking members 84 are retained in the release recesses 79 on the retainer 74 by the force of the spring 82 and do not interfere with the inner ring 70.

The first embodiment has the following advantages.

The spring 82 is installed in a compressed state and thus applies a force in the axial direction. When load torque applied to the compressor 21 is increased to a level that might damage the engine 67, the spring 82 is twisted by a relatively great amount. In this state, the urging force of the spring 82 moves the releasable locking members 84 axially. That is, the spring 82 disengages the releasable locking members 84 from the openings 72 of the inner ring 70. Accordingly, the power transmission from the engine 67 to the compressor 21 is stopped. The excessive load torque of the compressor 21 therefore does not affect the engine 67.

The value of the load torque at which the engine 67 is disconnected from the compressor 21 is determined based not on the frictional force of parts between the pulley 65 and the input shaft 26, but on the torsional rigidity of the spring 82 and the angular distance between the openings 72 and the release recesses 79. Therefore, the value at which power transmission is stopped is predictable. Further, the spring 82 is not influenced by centrifugal force. Thus, even if the pulley 65 is rotating at a high speed, the power transmission is not accidentally stopped.

If load torque applied by the compressor 21 does not exceed the predetermined level, the load torque fluctuations are moderated by torsional deformation of the limit spring 82.

The releasable locking members 84 are formed integrally with the spring 82. This construction reduces the number of the parts and is simple.

The spring 82 is a tightening spring that constricts toward the retainer 74 in accordance with load torque applied by the compressor 21. Therefore, the spring 82 requires less rigidity than a loosening spring, which expands from the retainer 74 when load torque is applied. Therefore, the spring 82 can be small and light. The parts associated with the spring 82 can be also small. As a result, the manufacturing cost of the transmission mechanism is reduced.

When power of the engine 67 is being transmitted to the compressor 21, the spring 82 grips the retainer 74. The rear portion of the spring 82 that includes the permanent locking members 83 contacts the retainer 74. The spring 82 is therefore securely retained on the retainer 74 at the rear portion. On the other hand, the front portion of the spring 82 that includes the releasable locking members 84 is separated from the retainer 74. Therefore, the rear portion of the spring 82 is positively twisted by load torque applied by the compressor 21. As a result, the spring 82 does not become misaligned with respect to the retainer 74 and the torsion characteristics of the spring 82 are stable. Thus, the disconnection characteristics of the torque limiting mechanism are stable and predictable. That is, the value at which the torque limiting mechanism disengages the engine 67 from the compressor 21 is stable and predictable.

The neck 81 is formed in the retainer 74 for separating the front part of the spring 82 including the releasable locking members 84 from the retainer 74. Therefore, a very simple machining process is required to separate the front part of the spring 82 from the retainer 74.

The spring 82 is a double torsion coil spring having two strands. The permanent locking members 83 are spaced apart at equal angular intervals and are fixed to the retainer 74 so that the strands do not rotate relative to the retainer 74. The releasable locking members 84 are also spaced apart at equal angular intervals and are engaged with the openings 72 of the inner ring 70. This construction prevents the retainer 74 and the input shaft 26 from misaligning when power is transmitted from the engine 67 to the compressor 21.

The above torque limiting mechanism couples the engine 67 with the clutchless type compressor 21. In other words, the shaft 26 is always coupled to the engine 67 (under normal conditions). In a compressor having a clutch, if an excessive load torque is applied by the compressor, the clutch disengages the engine from the compressor. The compressor 21 has no clutch to disconnect the engine 67 from the compressor 21. However, the above described release mechanism, which has relatively simple construction, positively disengages the engine 67 from the compressor 21 when the load torque of the compressor 21 exceeds a predetermined value.

A second embodiment of the present invention will now be described with reference to FIGS. 6 to 8. The differences from the first embodiment will mainly be discussed below.

Figure 6:
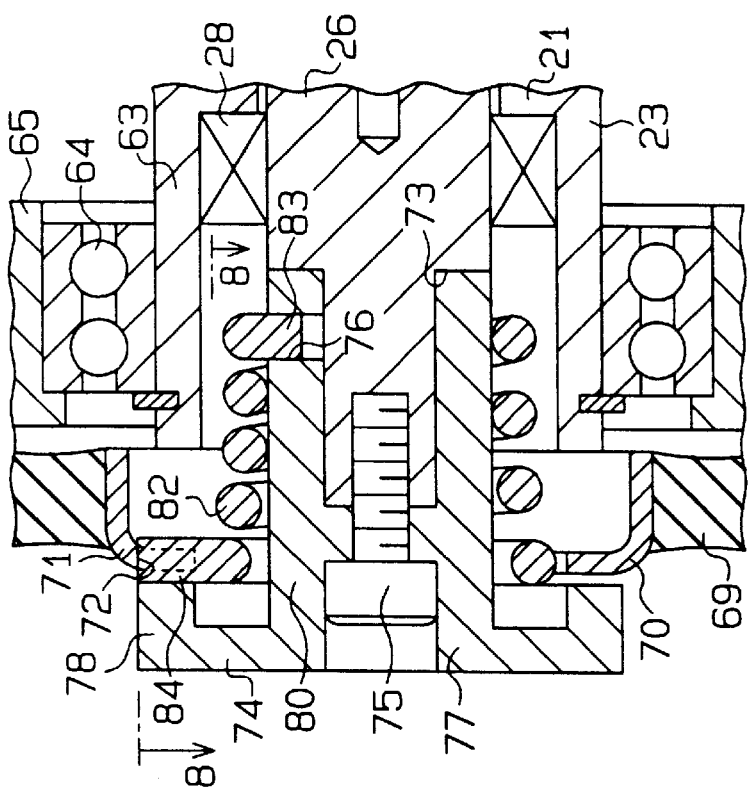
FIG. 6 is an enlarged partial cross-sectional view illustrating a torque limiting mechanism according to a second embodiment of the present invention when engaged.
Figure 7:
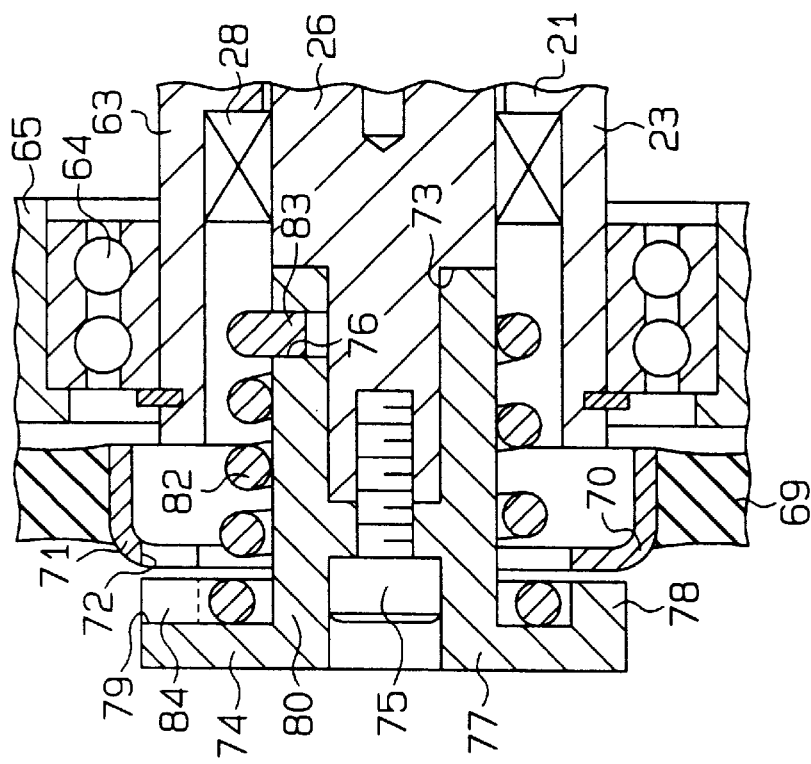
FIG. 7 is an enlarged partial cross-sectional view illustrating the torque limiting mechanism of FIG. 6 when disengaged.
Figure 8:
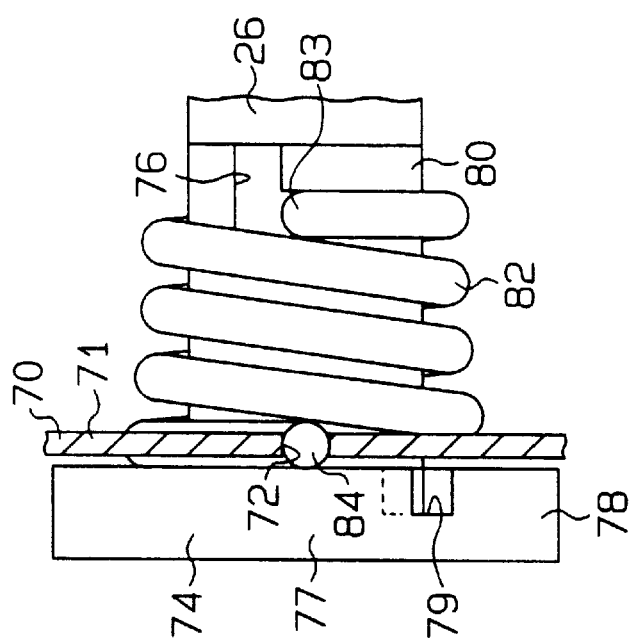
FIG. 8 is a cross-sectional view taken along line 8—8 of FIG. 6.

FIGS. 6 to 8 shows a torque limiting mechanism of the second embodiment. Unlike the retainer 74 of the first embodiment, the retainer 74 of the second embodiment has no neck 81. Instead, the cylinder 80 has a constant diameter. A spring 82 is wound about the retainer 74. The spring 82 is a tightening spring having a single strand. The rear portion of the spring 82, which includes a permanent locking member 83, has a constant diameter, while the front portion, which includes a releasable locking member 84, has a diameter that increases toward the releasable locking member 84. In other words, the spring 82 has a conical section. Therefore, the rear portion of the spring 82 contacts the retainer 74, while the front portion is separated from the retainer 74. As shown in FIG. 8, the permanent locking member 83 is inserted in an L-shaped engagement recess 76 formed in the retainer 74. The engagement recess 76 serves as a rotation restrictor of the spring 82.

The torque limiting mechanism of FIGS. 6 to 8 has substantially the same advantages as that of FIGS. 1 to 5. The mechanism of FIGS. 6 to 8 further has the following advantages.

The spring 82 has a single strand. The construction of the spring 82 is thus simple and easy to manufacture.

The rear portion of the limit spring 82, which includes the permanent locking member 83, has a constant diameter and contacts the retainer 74. Therefore, when the load torque of the compressor is applied to the spring 82, the spring 82 is twisted to constrict against the retainer 74. This guarantees positive engagement between the spring 82 with the retainer 74. On the other hand, the front portion of the spring 82, which includes the releasable locking member 84, has a diameter that increases toward the releasable locking member 84 and is separated from the retainer 74. This gives the spring 82 freedom to be twisted in accordance with load torque of the compressor 21 and to move axially if necessary. As in the mechanism of the first embodiment, the spring 82 is prevented from misaligning with respect to the retainer 74, and the torsional characteristics of the limit spring 82 are stable and predictable. That is, the torque load at which the mechanism disengages the engine 67 from the compressor is stable and predictable.

The permanent locking member 83 of the spring 82 is engaged with the L-shaped engagement recess 76 in the retainer 74. The spring 82 is therefore easily compressed by a predetermined amount when installed. That is, the releasable locking member 84 is engaged with the opening 72 formed in the inner ring 70. Then, the permanent locking members 83 is simply engaged with an end of the L-shaped engagement recess 76 for compressing the spring 82 by a predetermined amount.

The spring 82 may be assembled with the retainer 74 before the retainer 74 is secured to the input shaft 26 of a driven apparatus such as the compressor 21. This simplifies the assembly of the torque limiting mechanism.

A third embodiment of the present invention will now be described with reference to FIGS. 9 to 11. The differences from the first and second embodiments will mainly be discussed below.

The torque limiting mechanism of the third embodiment has a single-stranded spring 82 and a retainer 74. As shown in FIGS. 9 and 11, the retainer 74 has an engagement recess 76 serving as a spring rotation restrictor. A flexible member 87 is fitted in the engagement recess 76. The flexible member 87 is made of, for example, rubber. The flexible member 87 is located between the permanent locking member 83 of the spring 82 and the step 73 of the input shaft 26. The step 73 forms the inner wall of the rotation restrictor. When the retainer 74 is press fitted to the input shaft 26, the permanent locking member 83 of the spring 82 and the step 73 compress the flexible member 87 by a predetermined amount.

Figure 10:
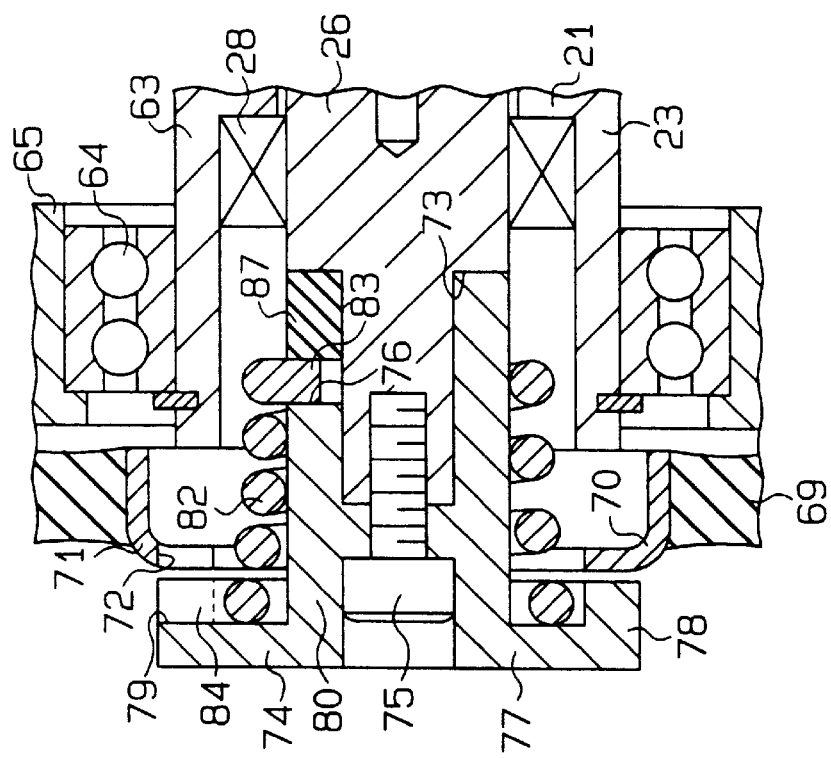
FIG. 10 is an enlarged partial cross-sectional view illustrating the torque limiting mechanism of FIG. 9 when disengaged.

As in the first embodiment, if an excessive load torque is applied by a driven apparatus such as the compressor 21, the limit spring 82 is greatly twisted as illustrated in FIG. 10. This causes the opening 72 on the ring 70 to align with the release recess 79 on the retainer 74. The force of the member 87 helps to disengage the releasable locking member 84 from the opening 72 and to engage the releasable locking member 84 with the release recess 79.

The third embodiment has the following advantages.

Figure 9:
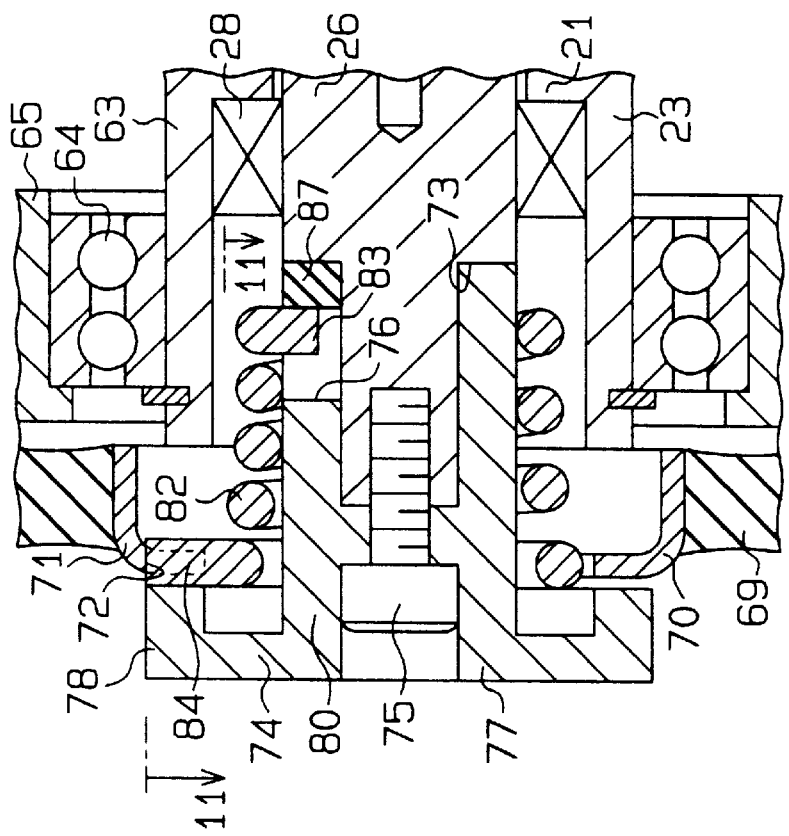
FIG. 9 is an enlarged partial cross-sectional view illustrating a torque limiting mechanism according to a third embodiment of the present invention when engaged.
Figure 11:
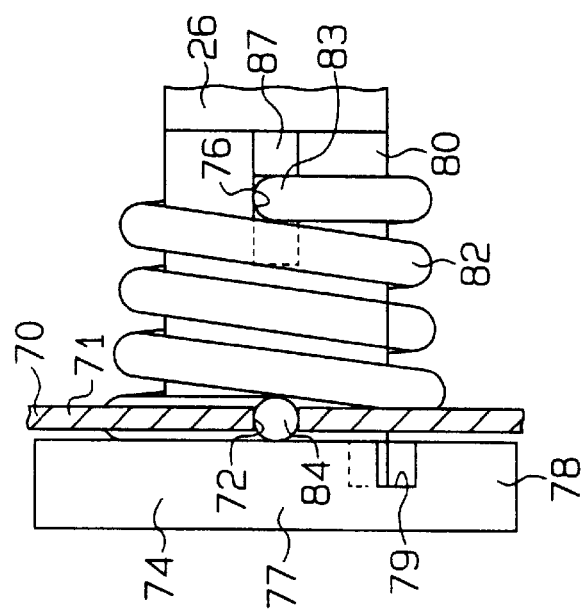
FIG. 11 is a cross-sectional view taken along line 11—11 of FIG. 9.

The torque limiting mechanism of FIGS. 9 to 11 has substantially the same advantages as the first and second embodiments. The mechanism of FIGS. 9 to 11 further has the following advantages.

When the load torque is excessive, the flexible member 87 is relieved and urges the spring 82 in the axial direction of the input shaft 26. Therefore, if the axial rigidity of the spring 82 is so great that the spring 82 cannot be compressed by a desired amount, the flexible member 87 guarantees the proper disengagement motion.

A fourth embodiment of the present invention will now be described with reference to FIGS. 12 to 14. The differences from the first to third embodiments will mainly be discussed below.

Figure 14A:
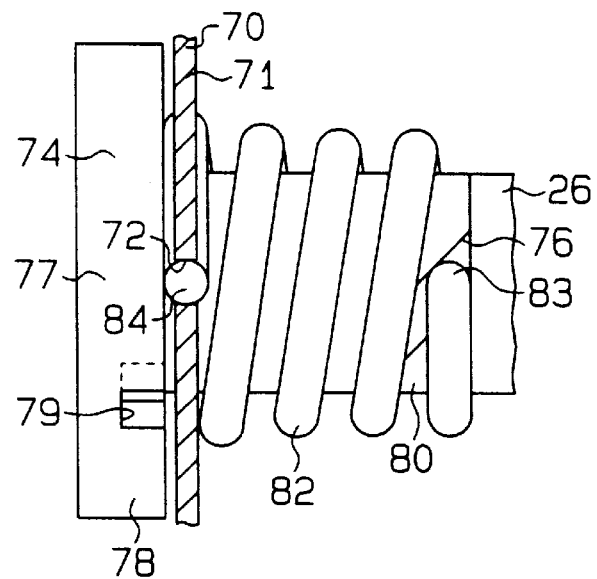
FIG. 14(a) is a cross-sectional view taken along line 14a—14a of FIG. 12.

The torque limiting mechanism of the fourth embodiment has a spring 82, which has a single strand, and a retainer 74. As shown in FIGS. 12 and 14(a), the retainer 74 has an engagement recess 76 serving as a rotation restrictor of the spring 82. The engagement recess 76 is formed in a helical manner with respect to the axis of the input shaft 26. The permanent locking member 83 of the spring 82 is engaged with the front end of the engagement recess 76. When power from a power source is transmitted to a driven apparatus such as the compressor 21, load torque applied by the driven apparatus is divided by the slanted engagement recess 76 into a component directed opposite to the rotational direction of the shaft 26 and a component directed forward along the axis of the input shaft 26. The component directed opposite to the direction of rotation of the shaft 26 twists the spring 82, whereas the axial component urges the rear end of the spring 82 forward, or towards the distal end of the retainer 74.

Figure 14B:
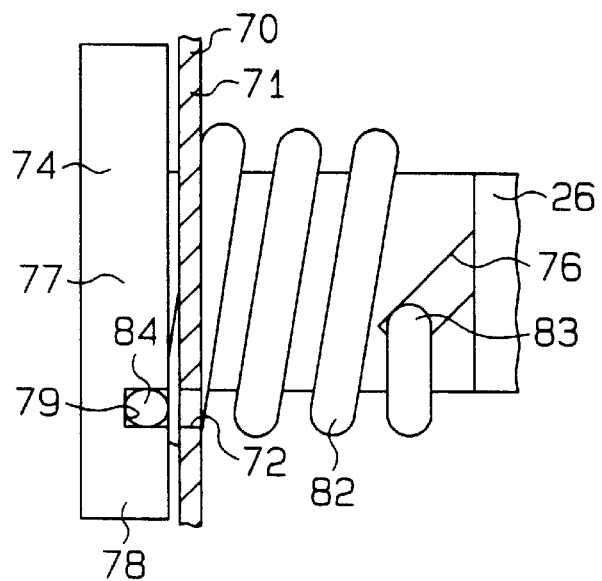
FIG. 14(b) is a cross-sectional view taken along line 14b—14b of FIG. 13.

As in the first embodiment, if an excessive load torque is applied to the compressor 21, the spring 82 is greatly twisted as illustrated in FIGS. 13 and 14(b). This causes the opening 72 on the ring 70 to align with the release recess 79 on the retainer 74. The axial component of the urging force acting on the spring 82 moves the releasable locking member 84 from the opening 72 and engages the releasable locking member 84 with the release recess 79. At this time, the excessive load torque is released. Therefore, the rear portion the spring 82 including the permanent locking member 83 expands radially outward from the retainer 74. This causes the permanent locking member 83 to move forward along the slanted engagement recess 76 (toward the left in FIG. 14(b)). As a result, the entire spring 82 is moved forward. The spring 82 therefore does not interfere with the inner supporting ring 70.

The torque limiting mechanism of FIGS. 12 to 14 has substantially the same advantages as the first to third embodiments. The mechanism of FIGS. 12 to 14 further has the following advantages.

When the load torque is excessive, the engagement between the helical engagement recess 76 and the spring 82 generates a force that urges the spring 82 forward along the axis of the input shaft 26. Therefore, if the axial rigidity of the spring 82 is so great that the spring 82 cannot be compressed by a desired amount, a means for moving the spring 82 axially is formed by a simple construction. Also, there is no need for extra parts for moving the spring 82. This reduces the number of parts in the mechanism.

A fifth embodiment of the present invention will now be described with reference to FIGS. 15 to 18. The differences from the first to fourth embodiments will mainly be discussed below.

Figure 15:
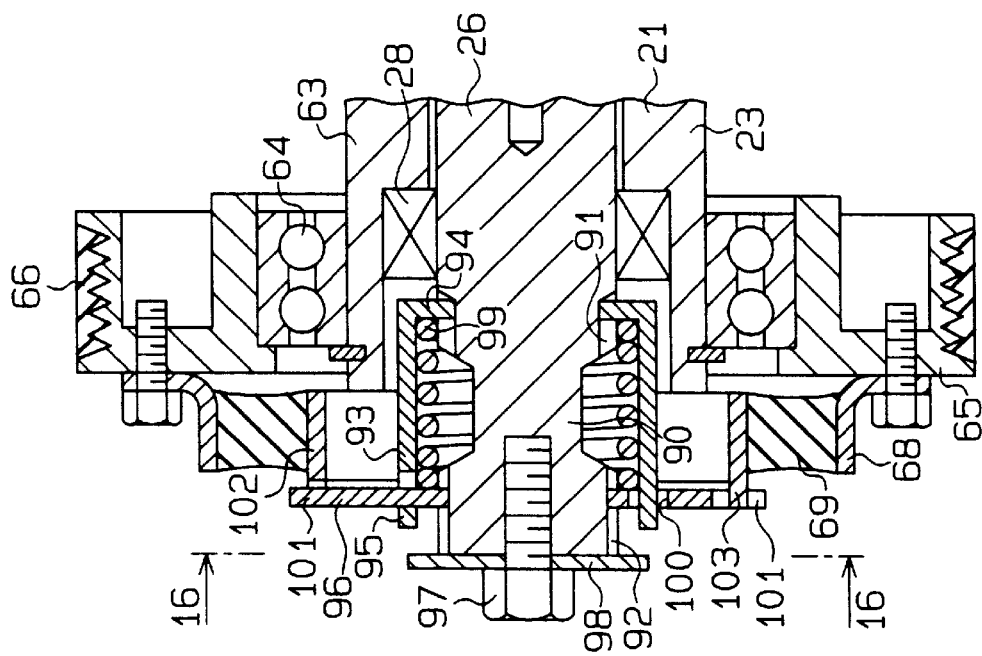
FIG. 15 is an enlarged cross-sectional view illustrating a torque limiting mechanism according to a fifth embodiment of the present invention when engaged.
Figure 16:
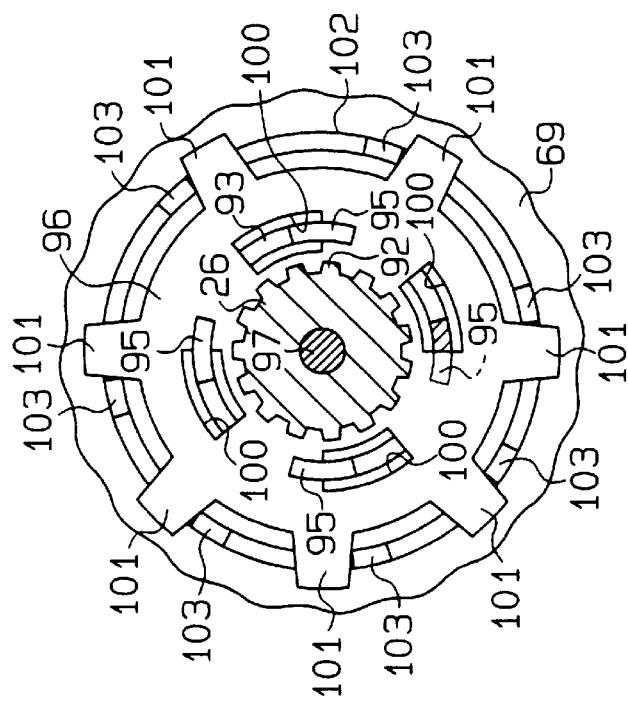
FIG. 16 is a cross-sectional view taken along line 16—16 of FIG. 15.

As shown in FIGS. 15 and 16, the input shaft 26 of this embodiment includes a small diameter portion 90. The small diameter portion 90 functions as a connector that normally transmits torque. A pair of splined portions 91, 92 are formed at the rear and front sides of the small diameter portion 90, respectively. The small diameter portion 90 and the splined portions 91, 92 are covered by a cylindrical cap 93. The cap 93 has a flange 94, which protrudes inward from the rear end of the cap 93. The flange 94 is secured to the rear splined portion 91. The cap 93 therefore rotates integrally with the input shaft 26. L-shaped claws 95 (four in this embodiment) extend from the front end of the cap 93 such that they open in the rotational direction of the drive shaft 26.

A disk-shaped connecting plate 96 is fitted to the front splined portion 92 of the shaft 26. The plate 96 slides axially with respect to the shaft 26. A washer 98 is secured to the input shaft 26 by a bolt 97 to prevent the plate 96 from disengaging from the shaft 26. A spring 99 extends between the plate 96 and the flange 94 of the cap 93. The spring 99 is compressed by a predetermined amount and urges the plate 96 in the axial direction of the shaft 26.

The plate 96 has arcuate holes 100 (four in this embodiment). Each hole 100 corresponds to one of the claws 95 of the cap 93. The plate 96 further has teeth 101 (seven in this embodiment). The teeth 101 extend radially from the periphery of the plate 96 and are spaced apart at predetermined angular intervals.

A support cylinder 102 is adhered to the inner wall of the rubber buffer 69. The cylinder 102 includes teeth 103 (seven in this embodiment) projecting forward. Each tooth 103 corresponds to one of the teeth 101 of the plate 96.

In normal operation state, the claws 95 of the cap 93 are inserted in and engaged with the holes 100 as illustrated in FIGS. 15 and 16. The teeth 101 of the plate 96 engage with the teeth 103 of the cylinder 102. Therefore, the torque of the power source is transmitted to the input shaft 26 by way of the belt 66, the pulley 65, the outer ring 68, the rubber buffer 69, the support cylinder 102, the plate 96 and the cap 93.

Figures 17, 18:
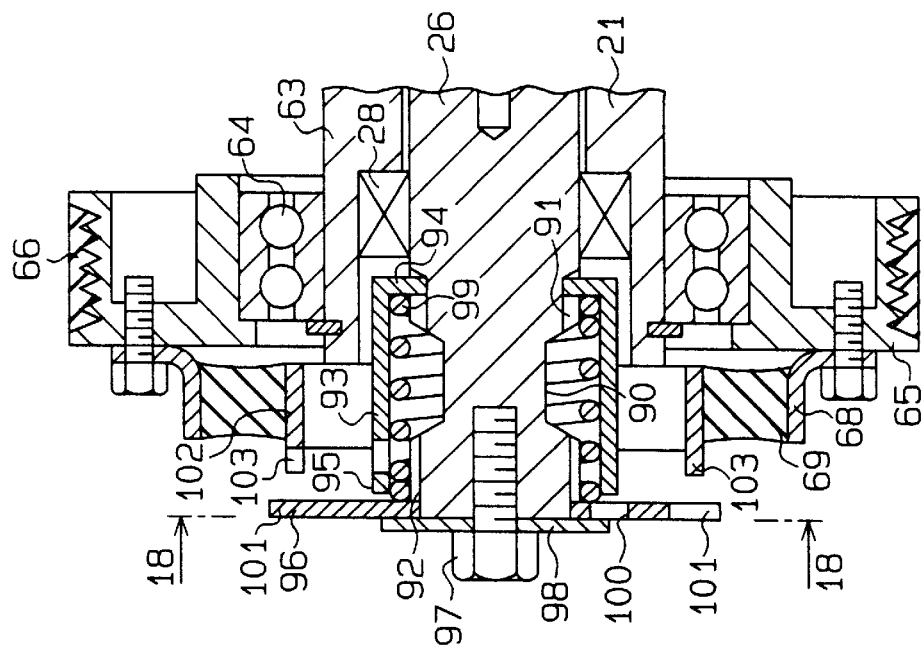
FIG. 17 is an enlarged cross-sectional view illustrating the torque limiting mechanism of FIG. 15 when disengaged.
FIG. 18 is a cross-sectional view taken along line 18—18 of FIG. 17.

If an excessive load torque is applied by a driven apparatus such as the compressor 21, the small diameter portion 90 of the input shaft 26 is twisted. This rotates the rear splined portion 91 with respect to the front splined portion 92 as illustrated in FIGS. 17 and 18. Thus, the claws 95 of the cap 93 are displaced in the direction opposite to the rotational direction of the shaft 26 with respect to the arcuate holes 100. The claws 95 are thus disengaged from the holes 100. Then, the force of the spring 99 moves the plate 96 forward along the axis of the shaft 26. Thus, the teeth 101 of the plate 96 are separated from the teeth 103 of the support cylinder 102 and the power transmission from the pulley 65 to the shaft 26 is stopped. In this state, the plate 96 is pressed against the washer 98 by the force of the spring 99. Therefore, the plate 96 does not interfere with the cap 93 and the cylinder 102.

The fifth embodiment has the following advantages.

When the load torque of the compressor 21 is increased to a level that might damage the engine 67, the small diameter portion 90 of the shaft 26 is twisted. This unlocks the plate 96 from the cap 93. In this state, the force of the spring 99 moves the plate 96 along the axis of the shaft 26 thereby disengaging the plate 96 from the support cylinder 102. Accordingly, the power transmission from the engine 67 to the compressor 21 is stopped. The excessive load torque of the compressor 21 is not transmitted to the engine 67.

Therefore, the value of load torque at which the compressor 21 is disconnected from the engine 67 is determined based not on frictional force of parts between the pulley 65 and the input shaft 26, but on the torsional rigidity of the small diameter portion 90 or on the engaging amount of the claws 95 with the holes 100. Therefore, the disconnection characteristics of the mechanism are stable and predictable. Further, the small diameter portion 90 is not influenced by centrifugal force. Thus, even if the pulley 65 is rotating at a high speed, the power transmission is not accidentally stopped.

Load torque fluctuations of the compressor 21 that do not exceed the predetermined value are moderated by twisting deformation of the small diameter portion 90.

The present invention may be alternatively embodied in the following forms:

In the first embodiment, the number of the strands in the spring 82 may be changed. The numbers of the strands may be, for example, 1, 3, 4, 5 or 6.

Reducing the numbers of the strands to one simplifies the construction of the mechanism. Increasing the number to three or more further prevents the retainer 74 from tilting when power is transmitted from the pulley 65 thereby stabilizing the rotation of the shaft 26.

In the second to fourth embodiment, the number of the strands in the spring 82 may be changed. The number of the strands may be, for example, 2, 3, 4, 5 or 6.

Increasing the number of strands in the spring 82 further prevents the retainer 74 from tilting when power is transmitted from the pulley 65 thereby stabilizing the rotation of the shaft 26.

In the first to fourth embodiments, each strand of the spring 82 may be wrapped in a direction such that the spring is loosened by the load torque of the driven apparatus such.

In the first and second embodiments, the permanent locking members 83 of the spring 82 may be omitted.

In the third embodiments, the flexible member 87 may be replaced by a coil spring or other type of spring.

In the third and fourth embodiments, the spring 82 may have a constant diameter along its longitudinal direction, and a neck 81 may be formed in the retainer 74 at a part corresponding to the front portion of the spring 82.

In the fifth embodiment, the numbers of the claws 95 and the arcuate holes 100 may be changed to, for example, 2, 3, 5, 6, 7 or 8.

In the fifth embodiment, the numbers of the teeth 101, 103 may be changed to, for example, 2, 3, 4, 5, 6, 8, 9 or 10.

These alternative constructions have the same advantages as the illustrated embodiments.

Therefore, the present examples and embodiments are to be considered as illustrative and not restrictive and the invention is not to be limited to the details given herein, but may be modified within the scope and equivalence of the appended claims.

What is claimed is:

1. A torque limiting apparatus for transmitting power supplied from a power source to a driven apparatus, comprising:
    a drive rotor powered by the power source:
        a driven rotor normally driven by the drive rotor, the driven rotor being connected to the driven apparatus such that the driven rotor delivers power to and receives load torque from the driven apparatus; and
        a flexible connector located between and coupled to the drive motor and the driven rotor for connecting the drive rotor to the driven rotor and for transmitting torque from the drive rotor to the driven rotor, wherein torque deforms the flexible connector, and the flexible connector is disconnected from one of the drive rotor and the driven rotor when the torque applied to the flexible connector exceeds a certain torque value, limiting the torque applied between the drive rotor and the driven rotor;
        the flexible connector having a releasable locking member for releasably engaging one of the drive rotor and driven rotor and a permanent locking member for permanently engaging the other of the drive rotor and the driven rotor.

2. The torque limiting apparatus according to claim 1, wherein the flexible connector is a torsion coil spring wound around the driven rotor.

3. The torque limiting apparatus according to claim 2, wherein the driven rotor includes an engagement recess for receiving the permanent locking member.

4. The torque limiting apparatus according to claim 3, wherein the drive rotor and the driven rotor are coaxial, the drive rotor is rotatable relative to the driven rotor, and the drive rotor has an opening for receiving the releasable locking member, and further wherein a wall of the opening engages the releasable locking member, the opening allowing the releasable locking member to escape from the opening when the torque applied to the flexible connector exceeds the certain value, and the driven rotor has a release recess for receiving the releasable locking member from the opening when the releasable locking member escapes from the opening, the release recess being angularly separated from the opening by a predetermined angle as measured about the axis of the driven rotor under normal operation conditions.

5. The torque limiting apparatus according to claim 4, wherein the drive rotor has a pair of coaxial rings coaxial to the driven rotor, the rings are resiliently connected to one another by a flexible material, and the opening is formed in an inner one of the rings.

6. The torque limiting apparatus according to claim 2, wherein the coil spring constricts against the driven rotor in response to load torque from the driven apparatus.

7. The torque limiting apparatus according to claim 2, wherein the coil spring has a first section located adjacent to the releasable locking member, the first section is spaced from the driven rotor, and the coil spring has a second section located adjacent to the permanent locking member, wherein coils of the second section contact the driven rotor.

8. The torque limiting apparatus according to claim 7, wherein the driven rotor has a neck section having a reduced diameter, the location of the neck section corresponding to the axial location of the first section of the coil spring.

9. The torque limiting apparatus according to claim 2, wherein the coil spring has a plurality of independent strands, each strand being wound around the driven rotor.

10. The torque limiting apparatus according to claim 4, wherein the driven rotor includes a rotary shaft having a first end, the apparatus further comprising a retainer fixed to the first end, the retainer having a flange with a diameter greater than that of the rotary shaft, wherein the engagement recess is formed in the rotary shaft and the release recess is formed in the flange.

11. The torque limiting apparatus according to claim 10, wherein the coil spring is normally compressed between the flange and the engagement recess, and when the load torque exceeds the certain value, relative rotation between the rotary shaft and the drive rotor causes the opening of the drive rotor to be axially aligned with the release recess of the flange, which causes the releasable locking member to escape from the opening into the release recess under the axial expansion force of the coil spring.

12. The torque limiting apparatus according to claim 11 further comprising a spring member located in the engagement recess for additionally urging the coil spring axially toward the flange.

13. The torque limiting apparatus according to claim 1, wherein the drive rotor and the driven rotor are coaxial and the drive rotor rotates relative to the driven rotor in correspondence with torsional deformation of the flexible connector when torque is applied to the flexible connector, and the apparatus further comprising a coil spring coaxial to the drive and driven rotors, the coil spring being axially compressed under normal operating conditions, and the spring being released to expand axially when the torque applied to the flexible connector exceeds the certain torque value, wherein the axial expansion of the spring uncouples the drive rotor from the driven rotor.

14. The torque limiting apparatus according to claim 1, wherein the flexible connector is a torsion coil spring wound around the driven rotor, the spring having a releasable locking member at one end for releasably engaging the drive rotor and a permanent locking member at the other end for permanently engaging the driven rotor.

15. A compressor for being powered by a power source, the compressor comprising a housing, an input shaft rotatably supported by the housing, a cam plate tiltably mounted on the input shaft, a hinge mechanism for connecting the input shaft to the cam plate, and a piston accommodated for reciprocation in a cylinder bore formed in the housing, wherein the compressor performs the suction, compression and discharge of a refrigerant gas in accordance with the reciprocation of the piston and rotation of the input shaft is converted to reciprocation of the piston by the cam plate, the compressor further comprising:

a drive rotor for being driven by the power source, the drive rotor being rotatably supported by the housing; and a flexible connector located between and coupled to the drive rotor and the input shaft for connecting the drive rotor to the input shaft and for transmitting torque from the drive rotor to the input shaft to drive the input shaft under normal operating conditions, wherein torque deforms the flexible connector, and the flexible connector is disconnected from one of the drive rotor and the input shaft when the torque applied to the flexible connector exceeds a certain torque value to limit the torque applied between the drive rotor and the input shaft;

the spring having a releasable locking member for releasably engaging one of the drive rotor and the input shaft and a permanent locking member for permanently engaging the other of the drive rotor and the input shaft.

16. The compressor according to claim 15, wherein the flexible connector is a torsion coil spring wound around the input shaft.

17. The compressor according to claim 16, wherein the input shaft includes an engagement recess for receiving the permanent locking member.

18. The compressor according to claim 17, wherein the drive rotor and the input shaft are coaxial, the drive rotor is rotatable relative to the input shaft, and the drive rotor has an opening for receiving the releasable locking member, and further wherein a wall of the opening engages the releasable locking member, the opening allowing the releasable locking member to escape from the opening when the torque applied to the flexible connector exceeds the certain value, the input shaft having a release recess for receiving the releasable locking member form the opening when the releasable locking member escapes from the opening, the release recess being angularly separated from the opening by a predetermined angle as measured about the axis of the input shaft under normal operating conditions.

19. The compressor according to claim 18, wherein the drive rotor has a pair of coaxial rings coaxial to the input shaft, the rings are resiliently connected to one another by a flexible material, and the opening is formed in an inner one of the rings.

20. The compressor according to claim 16, wherein the coil spring constricts against the input shaft in response to load torque from the compressor.

21. The compressor according to claim 16, wherein the coil spring has a first section located adjacent to the releasable locking member, the first section is spaced from the input shaft, and the coil spring has a second section located adjacent to the permanent locking member, wherein coils of the second section contact the input shaft.

22. The compressor according to claim 21, wherein the input shaft has a neck section with a reduced diameter, the location of the neck section corresponding to the axial location of the first section of the coil spring.

23. The compressor according to claim 16, wherein the coil spring has a plurality of independent strands, each strand being wound around the input shaft.

24. The compressor according to claim 18, wherein the input shaft has a first end the compressor further comprising a retainer fixed to the first end, the retainer having a flange with a diameter greater than that of the input shaft, wherein the release recess is formed in the flange.

25. The compressor according to claim 24, wherein the coil spring is normally compressed between the flange and the engagement recess, and when the load torque exceeds the certain value, relative rotation between the input shaft and the drive rotor causes the opening of the drive rotor to be axially aligned with the release recess of the flange, which causes the releasable locking member to escape from the opening into the release recess under the axial expansion force of the spring.

26. The compressor according to claim 25 further comprising a spring member located in the engagement recess for additionally urging the coil spring axially toward the flange.

27. The compressor according to claim 14, wherein the drive rotor and the input shaft are coaxial and the drive rotor rotates relative to the input shaft in correspondence with torsional deformation of the flexible connector when torque is applied to the flexible connector, the compressor further comprising a coil spring coaxial to the drive rotor and input shaft the coil spring being axially compressed under normal operating conditions, the spring being released to expand axially when the torque applied to the flexible connector exceeds the certain torque value, and the axial expansion of the spring uncouples the drive rotor from the input shaft.

28. The compressor according to claim 14, wherein the flexible connector is a torsion coil spring wound around the input shaft, the spring having a releasable locking member at one end for releasably engaging the drive rotor and a permanent locking member at the other end for permanently engaging the input shaft.

* * * * *

UNITED STATES PATENT AND TRADEMARK OFFICE
CERTIFICATE OF CORRECTION

PATENT NO. : 6,077,048

DATED : June 20, 2000

INVENTOR(S) : Masahiko OKADA et al.

It is certified that error appears in the above-identified patent and that said Letters Patent is hereby corrected as shown below:

Title page, column 1, at "[73] Assignee:" change "Jidoskokki" to --Jidoshokki--;

Column 15, line 34, after "member" change "form" to --from--.

Signed and Sealed this

Seventeenth Day of April, 2001

Attest:

NICHOLAS P. GODICI

Attesting Officer

Acting Director of the United States Patent and Trademark Office